(12) United States Patent
Siegl

(10) Patent No.: US 11,014,326 B2
(45) Date of Patent: May 25, 2021

(54) PREFORMS AND METHOD FOR PRODUCING PREFORMS

(71) Applicant: ALPLA WERKE ALWIN LEHNER GMBH & CO. KG, Hard (AT)

(72) Inventor: Robert Siegl, Dornbirn (AT)

(73) Assignee: ALPLA WERKE ALWIN LEHNER GMBH & CO. KG

( * ) Notice: Subject to any disclaimer, the term of this patent is extended or adjusted under 35 U.S.C. 154(b) by 670 days.

(21) Appl. No.: 15/514,790

(22) PCT Filed: Sep. 25, 2015

(86) PCT No.: PCT/EP2015/072118
§ 371 (c)(1),
(2) Date: Mar. 27, 2017

(87) PCT Pub. No.: WO2016/046370
PCT Pub. Date: Mar. 31, 2016

(65) Prior Publication Data
US 2018/0186035 A1     Jul. 5, 2018

(30) Foreign Application Priority Data

Sep. 25, 2014   (CH) .................................. 01453/14

(51) Int. Cl.
*B32B 1/02*   (2006.01)
*B29B 11/08*   (2006.01)
(Continued)

(52) U.S. Cl.
CPC ................ *B32B 1/02* (2013.01); *B29B 11/08* (2013.01); *B29B 11/14* (2013.01); *B29C 49/06* (2013.01); *B29B 2911/1402* (2013.01); *B29B 2911/1404* (2013.01); *B29B 2911/14026* (2013.01); *B29B 2911/14033* (2013.01); *B29B 2911/1434* (2013.01); *B29B 2911/1442* (2013.01); *B29B 2911/14326* (2013.01); *B29B 2911/14333* (2013.01); *B29B 2911/14426* (2013.01); *B29B 2911/14693* (2013.01); *B29B 2911/14913* (2013.01); *B29B 2911/14926* (2013.01);
(Continued)

(58) Field of Classification Search
CPC ......... B29B 11/14; B29B 11/08; B29C 49/00; B29C 49/0005; B29C 49/02; B32B 1/02; B65D 1/0207; B65D 1/0223; B65D 1/023; B65D 1/02; Y10T 428/1352; Y10T 428/1379; Y10T 428/1397
See application file for complete search history.

(56) References Cited

FOREIGN PATENT DOCUMENTS

| DE | 2503911 | 8/1976 |
|----|---------|--------|
| EP | 1403028 | 3/2004 |

(Continued)

*Primary Examiner* — Walter Aughenbaugh
(74) *Attorney, Agent, or Firm* — Morriss O'Bryant Compagni Cannon, PLLC

(57) ABSTRACT

The invention relates to a preform for producing a plastic container in a 2-stage stretch blow molding method, said preform having a preform body that extends along a central axis and that comprises: a first end a second end that lies opposite the first end, wherein the first end is closed and a neck part with a pouring opening adjoins the second end; and an inner wall that delimits an interior of the preform. Along a length of at least 30 mm of the interior, every point of the inner wall is at a distance of less than 3.5 mm from the central axis. Also disclosed are a suitable method and a device for producing such a preform.

14 Claims, 1 Drawing Sheet

(51) Int. Cl.
B29C 49/06 (2006.01)
B29B 11/14 (2006.01)
B29C 49/00 (2006.01)
B29C 49/64 (2006.01)
B29C 45/56 (2006.01)
B29L 31/00 (2006.01)
B29C 49/12 (2006.01)
B29C 49/02 (2006.01)
B29K 105/00 (2006.01)
B29K 67/00 (2006.01)

(52) U.S. Cl.
CPC ........ *B29C 45/561* (2013.01); *B29C 49/0005* (2013.01); *B29C 49/12* (2013.01); *B29C 49/6418* (2013.01); *B29C 49/6454* (2013.01); *B29C 2049/024* (2013.01); *B29C 2049/1228* (2013.01); *B29C 2049/1238* (2013.01); *B29C 2049/1242* (2013.01); *B29K 2067/003* (2013.01); *B29K 2067/04* (2013.01); *B29K 2105/0094* (2013.01); *B29K 2995/0043* (2013.01); *B29K 2995/0064* (2013.01); *B29L 2031/716* (2013.01); *Y10T 428/1352* (2015.01); *Y10T 428/1379* (2015.01); *Y10T 428/1397* (2015.01)

(56) References Cited

FOREIGN PATENT DOCUMENTS

| | | |
|---|---|---|
| EP | 2623292 | 7/2013 |
| GB | 2445547 | 7/2008 |
| JP | H03295615 | 12/1991 |
| WO | WO2008031447 | 3/2008 |
| WO | WO2013051601 | 4/2013 |

PREFORMS AND METHOD FOR PRODUCING PREFORMS

CROSS REFERENCE TO RELATED APPLICATIONS

This application is a national phase entry under 35 U.S.C. § 371 of PCT/EP2015/072118 filed on Sep. 25, 2015, which claims priority to Swiss Patent Application No. 1453/14 filed on Sep. 25, 2014, the entirety of each of which is incorporated by this reference.

TECHNICAL FIELD

The invention relates to a preform with a small inside diameter and a method for producing such a preform.

PRIOR ART

For packaging liquid foods and other pourable substances, for example, cleaning agents, body care agents, cosmetics, automotive media, etc., mainly plastic containers are used today. However, many materials gain their special properties only by means of stretching. For example, polyethylene terephthalate (PET), which is a very popular plastic, achieves by stretching a strength that is often more than 10 times greater than that of unstretched PET. Bottle-shaped plastic containers in particular are therefore often produced in a so-called injection stretch blow molding process.

First, in an injection molding process, a preform is produced in an injection mold. The preform normally has an essentially elongated cylindrical body and is closed on one longitudinal end. A supporting ring expediently separates the body from a neck part having a pouring opening. The neck part may already have the subsequent shape of the neck of the bottle. A thread or some other means for fastening a container closure may be formed on the outside or inside of the neck part. Such preforms are also important for the present invention.

After it has been produced, the preform is unmolded and processed further immediately or stored temporarily for subsequent processing by a blow molding machine. Before further processing in a blow molding machine, the preform is conditioned as needed. After this it is introduced into a blow mold on the blow molding machine and stretched there using a stretching mandrel (also referred to as a "drawing rod," a "stretching mandrel," a "stretching ram" or a "core rod") and blow molded by a gas injected into the preform in accordance with the mold cavity of the blow molding mold. After conclusion of the blow molding process, the finished plastic bottle is unmolded. This second part of the injection stretch blow molding process is a stretch blow molding process.

So-called two-step injection stretch blow molding processes (or synonymously: "two-step injection stretch blow molding processes") are important in particular for the present patent application. In the two-step injection stretch blow molding process, a preform is produced in the first step, and then the preform is stretched and blow molded in the second step to form the bottle (stretch blow molding method), wherein the two steps are carried out at separate locations and at separate times (carried out by means of separate machines). However, there are known blown molding processes in which the stretching and blow molding are carried out in direct succession following injection of the preform on the same machine (for example: one-step injection stretch blow molding). Or the preform remains partially on the injection core in such processes while the core at the same time forms a type of stretching mandrel (injection blow molding). However, most of the bottles are produced in the two-step injection stretch blow molding process.

In the two-step injection stretch blow molding process, PET preforms are stretched by a factor of two to five. For bottles with a capacity of one-half liter which may have a diameter of approx. 6 centimeters, this is easily implemented with a preform having a diameter of approx. 2 centimeters. This is because the injection core with such a diameter of the preform itself may still have a diameter of more than 1 centimeter even with a wall thickness of the preform of 4 millimeters, which allows a sufficient stability of the injection core and integration of cooling into the injection core. However, for smaller bottles of 100 or 200 milliliters, for example, the diameter of the bottles and thus also the diameter of the preforms from which they are produced is much smaller. Accordingly, thinner injection cores are also needed for production of such preforms. However, injection cores with a diameter of less than 1 centimeter are problematic. If they are produced from hardened steel, they break easily if material flows into the injection cavity in a malfunction of the mold. Or they are permanently deformed, which has the result that a uniform wall thickness cannot be produced with the preform in this process. Injection cores produced from a more flexible material than hardened steel have the disadvantage that they can be bent reversibly in one direction during injection molding due to the pressure of the injected polymer, which in turn leads to an irregular wall thickness of the preform. However, an irregular wall of the preform results in an irregular wall thickness of the container to be produced from the preform, which is undesirable. Another problem with thin injection cores is the restricted or nonexistent possibility—depending on the dimensioning—of being able to cool them adequately internally with cooling water because only limited space is available for cooling ducts.

In addition, when using small injection cores there is also the problem that the polymer melt, which contracts during cooling, detaches itself from the much larger outside contour of the cavity and further cooling of the polymer melt can then take place only through the much smaller area of the injection core. Therefore, with known injection molding processes, an attempt is made to subsequently inject as much polymer melt as possible into the cavity in a so-called holding pressure phase in order to compensate for the volume shrinkage of the cooling melt. However, this is successful only to a limited extent and is no longer feasible technically after the sprue solidifies at the latest.

In addition to the prior art in the injection molding process, numerous processes are known for preform flow pressing in which essentially the cavity is only filled partially and the material is displaced (flows) due to the penetration of the injection core to such an extent that the entire preform cavity is filled.

However, the forces in the flow press process are much higher so that small preforms with thin-walled cores also cannot be produced with such processes. The problems here are more similar to those than injection molding with respect to the stability of the core (too fragile and breakable or much too flexible).

In addition, there are a number of very commonplace problems in injection molding processes for producing preforms. For example, a preform is typically designed so that the polymer composition can fill up the entire preform. When using the conventional PET polymer compositions which have a viscosity of 0.72 and/or 0.88 dL/g (according to ASTM D4603), a ratio of the average preform wall thickness to the flow path (injection point to the end of the thread) should not exceed 1 to 56 because otherwise it becomes difficult to fill up the entire preform cavity.

Advantages of the Invention

One advantage of the present invention is to supply preforms and a process for producing preforms. The preforms should have small volumes, be inexpensive to produce and be suitable for production of small bottles with a high stretching ratio to the stretch strengthening of the container wall.

Additional advantages and goals of the present invention are derived from the following description.

DESCRIPTION OF THE INVENTION

The advantages above are achieved by a preform and a method for producing a preform according to the present invention.

A preform for producing a plastic container in a two-step injection stretch blow molding process having a preform body that extends along a central axis of the preform, with a first end and a second end opposite the first end, wherein the first end is closed and a neck part having a pour opening is connected to the second end, and having an inside wall adjacent to an interior space of the preform, wherein each point on the inside wall of the interior space for a length of at least 30 millimeters is a distance of less than 3.5 millimeters from the central axis.

In addition a method for producing a preform should also be disclosed, wherein
 one cavity in a mold is filled completely with a hot molten polymer composition, wherein the cavity is formed by a female mold and a core, the female mold defining the exterior shape of the preform and the core defining the shape of the interior space of the preform in the area of the neck part,
 the hot polymer composition is cooled by contact with the female mold and the core, wherein volume shrinkage of the polymer composition is induced by cooling of the polymer composition, and
 a pin is inserted into the polymer composition along the central axis of the preform to be produced, wherein the volume shrinkage is compensated by insertion of the pin, wherein the pin defines at least a partial area of the shape of the interior space of the preform in the area of the preform body,
 for a length of at least 30 millimeters, each point on the inside wall of the preform to be produced (and/or each point on the pin) is a distance of less than 3.5 millimeters from the central axis, and
 the preform is removed from the cavity.

Features are described below, which are to be considered (individually) as desired features even if they are not mentioned explicitly as such. These features are disclosed separately (as part of any method or any preform) and—unless they are mutually exclusive—in any combination. This includes the possibility of simultaneous implementation of all the features described.

Preforms such as those described in the present patent application are configured for use in a stretch blow molding process and/or for production of plastic containers such as those disclosed in the patent application with the title "Plastic Containers and Stretch Blow Molding Process" with the same filing date as the present patent application. The process disclosed in the present patent application for producing a preform can also be part of a two-step stretch blow molding process for production of plastic containers according to the patent application mentioned above with the title "Plastic Containers and Stretch Blow Molding Process." The contents of the aforementioned patent application shall be regarded as part of the contents of the present patent application.

The preform is provided for producing a plastic container in a two-step injection stretch blow molding process. In such a two-step injection stretch blow molding process, the preform is cooled to room temperature after being produced and is optionally stored temporarily before being processed further by stretch blow molding to form the container. Before the stretch blow molding operation, the preform may be heated in an oven, wherein the entire preform or at least the preform body is heated, such as to a temperature of at least 80° C.

The preform body extends along the central axis of the preform and has a first end and a second end that is essentially opposite the first end. The first end is closed by a bottom of the preform. A neck part with a pour opening is connected to the second end of the preform body. In addition, the preform has an inside wall bordering the interior space of the preform. The central axis runs through the first end and through the second end of the preform body. It is desirable here if the central axis runs through the center of the interior space and/or the midpoint of the pour opening.

For a length of the preform of at least 30, 40 or 50 millimeters, each point on the inside wall is less than 3.5 or 3 or 2.5 millimeters from the central axis, wherein the length of the preform is measured in parallel with the central axis. An area with the described length and the described distance of the inside wall from the central axis is connected to the bottom of the preform and/or the aforementioned area is essentially contained in the section of the preform body connected to the bottom of the preform as described in greater detail below.

An advantageous preform has a neck part with an opening and a preform body. The opening in the neck part corresponds to the pour opening in the container to be produced from the preform or the aforementioned pour opening is formed from the aforementioned opening in the process. Therefore, in this document, the opening in the neck part is also referred to in the description of the preform as being a pour opening.

A supporting ring may be arranged on the neck part, such as on the transition area between the neck part and the preform body. Such a supporting ring facilitates the handling of the preform in the two-step processes in which these preforms are stored temporarily after production.

According to one variant, the preform may have an essentially cylindrical preform body (in particular a circular cylindrical body). The neck part may also have such a shape.

However, it is also possible to provide that the preform body is designed to be essentially rotationally symmetrical or to be round or oval in a cross section at a right angle to the central axis or to have a regular polygonal shape.

The preform body may be designed to be elongated and/or essentially tubular.

Alternatively or additionally, there is the possibility that the preform body tapers from the neck part in the direction of the bottom of the preform.

It is possible to provide that the preform body has a section connected to the bottom of the preform, a section connected to the neck part and, in between, a section which tapers (such as in a conical shape). The tapering section advantageously establishes the transition between the section connected to the bottom and the section of the preform body connected to the neck part and may also be referred to as a "preform ramp" or a "preform shoulder."

According to an embodiment variant, the average wall thickness of the section connected to the bottom of the preform is larger (such as by at least 80% to 120%) than the average wall thickness of the section connected to the neck part and/or than the average wall thickness of the tapering section.

An average wall thickness of the section of the preform body connected to the bottom of the preform may be 3 to 5 millimeters.

The wall thickness of the tapering section may become larger in the direction from the section connected to the neck part to the section connected to the bottom (increasing in size uniformly in particular), namely advantageously from a wall thickness corresponding to the wall thickness of the section connected to the neck part to a wall thickness corresponding to the wall thickness of the section connected to the bottom of the preform. However, the wall thickness of the tapering section may also be essentially constant. In the latter case, it is possible to provide that the wall thickness of the section connected to the bottom of the preform increases in the direction from the tapering section to the bottom of the preform. One example here would be stepped preform bodies.

An average wall thickness of the section connected to the neck part may be between 1 and 2.5 millimeters.

The section connected to the neck part may have a shape such as that described for the neck part further below. The aforementioned section may be designed in particular as a circular cylindrical shape.

Measured in parallel with the central axis of the preform, a length of the section connected to the neck part amounts to at least 1 millimeter and/or at most 10 millimeters and/or the length of the tapering section is at least 1 millimeter and/or at most 20 millimeters and/or the length of the section connected to the bottom of the preform is at least 5 millimeters and/or at most 50 millimeters.

The neck part may have a thread on the outside and/or inside or may have some other fastening means (e.g., in the form of protrusions and/or recesses) for the fastening of a container cover.

If a supporting ring is provided, then the aforementioned fastening means and the preform body may be opposite one another with respect to the supporting ring.

If the neck part has an essentially circular cylindrical shape, then its inside diameter, i.e., the diameter of the interior space in the area of the neck part amounts to more than 9 millimeters and/or less than 22 millimeters.

The preform is on the whole more than 30 or 40 millimeters long and/or less than 150 or 120 or 90 millimeters long.

The preform is designed for use in a stretch blow molding process for producing a container, in particular a bottle.

It is possible to provide that the pin is inserted into the polymer composition along the central axis of the preform to be produced, wherein due to the insertion of the pin, the volume shrinkage is partially or entirely compensated.

According to a another variant, it is provided that the preform is finished by injection molding without a holding pressure out of the injection machine used for the injection molding.

Alternatively, the preform may also be finished by injection molding with a holding pressure out of the injection machine used for the injection molding.

It is advantageous if the preform has an acetaldehyde content of less than 2.5 ppm, as may be measured by the Fraunhofer method (IW Freising 1.4001). Since the acetaldehyde content declines over time, what was said above for a preform that was produced less than 6 months previously should also be applicable here.

According to one variant, the preform and/or the polymer composition do(es) not contain any acetaldehyde-reducing additive.

It is optionally possible to provide that the preform and/or the polymer composition do(es) not contain any chain extender additives.

The preform has an interior space, which extends from the pour opening to the bottom of the preform. In production of the preform, the shape of the interior space in the area of the neck part may advantageously be defined by the core. The shape of cavity in the area of the preform body is defined by the core and/or the pin.

The (a)/(b) ratio is may be greater than 60, 70 or 80 and/or less than 150, 130 or 110, where (a) corresponds to the average wall thickness of the preform in the area of the preform body and (b) corresponds to the length of the wall of the preform from the pour opening to the center point of the bottom.

The aforementioned length of the wall is measured along a line running in the area of the preform body in the center of the wall (i.e., in the center between the outer and inner surfaces of the wall). In the area of the neck part, the line also runs in the middle of the wall, wherein structures on the outside or on the inside of the wall (e.g., threads or supporting rings) are not to be taken into account. According to one variant, the line runs at a constant distance from the inside wall in the area of the neck part wherein the constant distance corresponds to the distance from the inside wall at the center of the wall at the location of the lowest wall thickness, namely at a distance from the edge of the pour opening. This is because the location of the smallest wall thickness logically does not refer to the edge of the pour opening because the wall thickness tapers to zero there.

An advantageous ratio of the length (L) of the preform to the middle wall thickness (D) of the preform in the area of the preform body (i.e., L/D) is greater than 15 or 20 and/or less than 120 or 150.

As already described, the distance of each point on the inside wall from the central axis in the interior space of the preform, in particular in the area of the preform body is less than 3.5 millimeters along a length of at least 30 millimeters. The ratio of the length of the preform (L) to said distance (A) of the preform (i.e., L/A) is advantageously greater than 10, 14 or 18.

The preform is one for use in a stretch blow molding process for producing plastic container, wherein the container may be strengthened by stretching and/or the container is a bottle and/or the container has a capacity of less than 450, 350 or 250 milliliters and/or more than 50 milliliters.

The polymer composition and/or the preform may contain polyethylene furanoate (PEF) and/or polyethylene terephthalate (PET) and/or polypropylene (PP) and/or polyethylene naphthalate (PEN) and/or polylactic acid (PLA). It is advantageous if the polymer composition and/or the preform consist(s) essentially of one of the aforementioned polymers or if one of the aforementioned polymers constitutes the predominant portion of the polymer composition and/or of the preform, i.e., is present in an amount (based on the total weight of the polymer composition or of the preform) of at least 80%, 90% or 95%. It is especially desirable here if the preform is produced essentially from PET or PEF.

The polymer composition and/or the preform may contain copolymers, additives, dyes, lubricants, fillers, coatings and/or other additives, in an amount (based on the total weight of the polymer composition or the preform) of less than 15%, 10% or 5%.

The PEF referenced above may be produced entirely or partially from petroleum or from biomass (less than 1000 years old).

The cavity is formed by a female dye and a core. The polymer composition is cooled by contact with the cavity so that a volume shrinkage (reduction in volume) of the polymer composition is induced. The volume shrinkage achieved by cooling the polymer composition is compensated entirely or partially by insertion of the pin and/or the pin being inserted takes up some or all of the space that is freed due to the volume shrinkage of the polymer composition in the cavity.

If only a portion of the volume shrinkage is compensated by the insertion of the pin, then another portion of the volume shrinkage can be compensated by a holding pressure, i.e., by further addition of polymer composition into the cavity.

When reference is made to addition of the polymer composition to the cavity in this document, this refers to addition in which the mold is completely filled with the hot molten polymer composition. This process advantageously involves the initial addition of polymer composition to the cavity.

If essentially the entire volume shrinkage is compensated by the insertion of the pin, then (after addition of the polymer composition to the cavity) further addition of polymer composition to the cavity and/or a holding pressure may be omitted.

There is the possibility that before adding the polymer composition to the cavity, the pin is already partially inserted and/or is already partially in the cavity. After adding the polymer composition to the cavity, the pin can then be inserted further to entirely or partially compensate for the described volume shrinkage.

When speaking, in this document, of the fact that the pin is inserted, this is understood to mean that the pin is inserted into the polymer composition and/or into the cavity, wherein in the event of lack of clarity, the insertion is understood to refer to insertion after adding the polymer composition to the cavity.

Inserting the pin partially into the cavity already before adding the polymer composition to the cavity makes it possible to adjust the volume of the cavity. This may be advantageous in conjunction with the use of various polymers, which undergo different degrees of volume shrinkage as they cool.

If the volume shrinkage induced by cooling of the polymer composition is compensated entirely or partially by insertion of the pin, then a holding pressure can be entirely or partially omitted, which makes faster cycles possible. Depending on the type of device used, other improvements can also be achieved. For example, a worm gear would be bound by the holding pressure during direct injection into the hot channel (i.e., the channel carrying the polymer to the cavity). In the case of injection machines having indirect injection, expensive components such as a holding pressure module or shooting POT can be omitted if no holding pressure is necessary. Complex expensive worm gear drives with intrusion would no longer be necessary.

This method is especially characterized in that the preform is fabricated without holding pressure. If holding pressure can be omitted, then the use of much smaller injection equipment is possible because the worm gear has much more time for plastification if the holding pressure time is omitted. Due to the longer time available for plastification, smaller more favorable injection equipment can be used, with shorter dwell times of the melt at a high temperature. In general acceleration of the process and short dwell times of the melt are to be welcomed because with many materials every second counts because of thermal degradation. In the case of PET, for example, a degradation product that is called acetaldehyde is formed and this is a definite problem especially with small bottles, for example, small mineral water bottles due to the unfavorable surface-to-volume ratio.

It may happen that the volume of the polymer composition (in the cavity) is greater before insertion of the pin than the volume of the polymer composition in the form of the preform after removal of the preform from the cavity.

The aforementioned volumes differ essentially by the volume which corresponds to the pin or the pin part inserted (after addition of a polymer to the cavity).

The amount of polymer in the polymer composition in the cavity (i.e., the mass of the polymer) before insertion of the pin may be equal in size to the amount of polymer in the polymer composition in the form of the preform after removal of the preform from the cavity.

The mold (in particular the female mold and/or the core) and/or the polymer composition is/are cooled during the insertion of the pin, for example, by means of a fluid such as water. The fluid can be conducted through ducts in the mold, for example (in particular ducts in the female mold and/or in the core). The shape and/or polymer composition may also be cooled before and/or after insertion of the pin.

It is desirable if, during the insertion of the pin, the pin is not cold (except for the cooling that occurs due to the polymer itself). In this case, there is the possibility that the pin is designed to be solid and/or does not have any cooling ducts. Therefore, an increased stability of the pin can be achieved. The pin may be made of steel.

According to one embodiment variant, the pin is cooled before insertion of the pin and/or after removal of the pin from the cavity, namely by cooling from the outside and/or not from the inside.

According to another variant, the pin can be moved out of the core and can be moved into the core and/or the pin is moved into the polymer composition during the insertion and/or moved out of the core and into the cavity.

The pin may advantageously be cooled by contact with the core. To this end, the pin may be moved into the core.

There is also the possibility for the cooling of the pin to take place by direct contact of the pin with a cooling fluid such as air. According to one embodiment variant, the pin is removed from the cavity for this purpose and brought into contact with the fluid, for example, by moving it into a cooled shaft.

The polymer composition may be cooled only over the female mold and the core before insertion of the pin, so it remains molten at the location where the pin is immersed during the insertion.

Due to cooling of the core and/or of the pin, it is possible to prevent polymer from sticking to the core and/or the pin during unmolding of the preform and pulling threads, or at least one improvement can be achieved with regard to these problems, because deformation may occur due to the adhesion of the polymer during unmolding of the preform.

Alternative or additionally, the outside of the core and/or of the pin which come in contact with the polymer composition may have an adhesion-reducing surface or layer.

The adhesion-reducing surface area or layer expediently has a lower coefficient of adhesive friction (for example, lower by at least 10% or 20%) than would said outside without the aforementioned adhesion-reducing surface or layer or than the surface of the female mold that comes in contact with the polymer composition.

According to one variant, the adhesion-reducing surface has a structure which creates a lotus effect or a comparable effect.

The adhesion-reducing surface may also have a center-to-center roughness value (arithmetic mean of the deviations from the center line) of less than 1.5 micrometers. This can be achieved, for example, by polishing the surface.

The adhesion-reducing layer may be in solid form, such as in the form of a Teflon layer. An adhesion-reducing layer may be applied to the surface of the pin, for example, by means of a plasma coating.

However, there is also the possibility that the adhesion-reducing layer is present in a free-flowing form, in particular a liquid form, such as as a lubricant. The lubricant may optionally be replaced at regular intervals or after each unmolding of a preform. The lubricant may be oil or a powder.

In the proposed process, it is provided that the cavity of the mold is filled with a liquid polymer composition. The polymer composition is one that is solid at room temperature, wherein it has a temperature which is above its melting point at the time of addition to the cavity so that it is in liquid form. The word "hot" in this context means that the polymer composition is at a temperature high enough to keep the polymer composition free flowing and/or at a temperature above the melting point of the polymer composition. A temperature of the polymer composition when added to the cavity may be 20° C. to 40° C. above the melting point of the polymer composition. In the case of polyesters, it is typically approx. 30° C. higher than the melting point. In the case of PET, the melting point is usually 245° C. and processing takes place, for example, at approx. 275° C. to 295° C. Therefore, the aforementioned temperature may be between 260° C. and 300° C. in the case of PET.

The volume of the polymer composition (volume shrinkage) is reduced due to the cooling of the polymer composition in the cavity, in particular due to the contact with the female mold which is cooled. The polymer composition contracts and the volume in the cavity which thereby becomes free is compensated and/or filled by the pin due to the insertion of the pin according to the embodiment.

It is advantageous if the volume of the polymer composition is reduced by at least 1%, 2% or 3% and/or at most 20%, 15% or 11% (in comparison with the volume of the polymer composition before cooling) due to the cooling in the cavity. If the polymer composition consists essentially of polyethylene terephthalate (PET), then it is possible to provide for the reduction in volume to amount to at least 3% and/or at most 11%.

Alternatively or additionally, it is possible to provide that the density of the polymer composition is increased by at least 1%, 2% or 3% and/or at most 25%, 18% or 12% due to the cooling in the cavity (in comparison with the density of the polymer composition before cooling). If the polymer composition consists essentially of polyethylene terephthalate (PET), then it is possible to provide, for example, that the density of the polymer composition before cooling amounts to approx. 1.2 g/cm$^3$ and after cooling to approx. 1.3 g/cm$^3$.

The volume of the cavity is reduced due to the insertion of the pin and/or the shape of the cavity is altered due to insertion of the pin. According to one variant, it is possible to provide that the volume of the part of the pin that is inserted into the polymer composition corresponds essentially to the described volume shrinkage of the polymer composition.

However, the volume of the described part of the pin may also be smaller than the described volume shrinkage, wherein the difference between the volume and the volume shrinkage can be compensated by adding more polymer to the cavity (holding pressure).

Since the cavity is filled with the free-flowing polymer composition before the pin is inserted, the polymer composition must not flow between the pin and the female mold when added to the cavity. If the pin has been inserted into a polymer composition which is already in the cavity, then this eliminates the problem also described further above namely that the pin is forced to the side by the polymer composition. The pin may therefore have a smaller cross section than is customary in processes in which the polymer composition is injected into the final mold for the first time only after insertion of a pin or core into the mold.

In this process, the cavity of the mold is filled with a molten polymer composition, such as in an injection process. The addition of polymer composition to the cavity may then be stopped. The pin is inserted into the polymer composition now situated in the cavity and the pin is inserted into it. In the proposed process the cavity of the mold is essentially filled completely with the free-flowing polymer composition before the pin is inserted.

If, as in flow pressing, the cavity would first have to be filled up due to the pin being inserted, then greater forces would have to act on the pin being inserted. With regard to the ratio of "wall thickness to flow path," an increased flexibility is achieved due to the insertion of the pin. This need not be less than 1 to 56 because, when filling up the cavity, the polymer composition is not hindered by a core already being inserted, the polymer composition need not be hindered and the polymer composition might solidify too early. It has been found that by filling the cavity with the free-flowing polymer composition before inserting the pin, ratios of wall thicknesses to "flow paths" of much more than 60 can be achieved. Since the term "flow path" might be misunderstood because of the change in the method of production, instead of speaking of the length of the wall of the preform above, we speak of the opening of the preform up to the midpoint of the bottom of the preform. This corresponds to the distance a polymer would have to flow according to the known methods.

The midpoint of the bottom of the preform may also be in the present case the point at which the polymer composition enters the cavity. If the preform is produced by injection molding, then the gating point would be localized at the location described.

The cavity advantageously defines the shape of a preform for which the (a)/(b) ratio described above and/or the L/D ratio also described above is/are relevant.

The reduced length and wall thickness of the preform allow greater stretching at the same volume of the container produced from it. Such containers may be less susceptible to the development of stress cracking due to the greater stretching. The increased strength also makes it possible to produce lighter containers.

The polymer composition that is still liquid when added to the cavity is solidified in the cavity by the cooling.

The pin is advantageously inserted into the polymer composition during the cooling and/or solidification of the polymer composition in the cavity.

The cooling of the polymer composition in the cavity is continued until the temperature of the polymer composition has dropped below the melting point and/or below the glass transition temperature of the polymer composition. The polymer composition is a solid state and/or is no longer free-flowing after solidification. In the solidified state, the polymer composition is in the shape of the preform and can be removed from the cavity as a preform.

It is possible to provide that due to the insertion of the pin, a portion of the polymer composition is displaced, i.e., from one location in the cavity to another location.

It is advantageous if the polymer composition is pressed against the female mold and/or a separation of the polymer composition from the female mold due to the volume shrinkage is delayed or even prevented by the insertion of the pin. It is therefore possible to achieve the result that the outside of the preform to be produced remains in contact with the female mold for a longer period of time and therefore can be cooled more effectively.

According to one variant, the polymer composition can be pressed against the female mold due to the insertion of the pin, whereupon a tensile stress is exerted on the polymer composition in the direction of the circumference of the preform and/or in the direction of the circumference of the pin. This tensile stress may lead to an orientation of the molecular chains in the polymer in the aforementioned direction. Such an orientation can advantageously improve the mechanical properties of the preform to be produced. For example, the increase in volume induced by the creep of the material and/or the $CO_2$ loss can be reduced, which is an advantage specifically in the case of small bottles.

The central axis of the preform essentially coincides with the central axis of the pin and/or that of the core.

The direction in which the pin moves on insertion is expediently parallel to the central axis of the preform.

The female mold defines the exterior shape of the preform, in the area of the neck part as well as in the area of the preform body.

The core defines the interior space of the preform in the area of the neck part.

The pin defines (entirely or partially) the interior space of the preform in the area of the preform body, in particular the part of the interior space connected to the bottom of the preform.

The pin may be movable relative to the core and/or can be extracted out of the core.

The female mold, the core and the pin as far as its end position together define the shape of the preform, including any optional supporting ring.

The distance of each point of the pin from the central axis of the pin (and/or from the central axis of the preform to be produced) may be smaller than 3.5 or 3 or 2.5 millimeters. This may be true for the entire pin which is in the end position in the cavity or at least for the portion of the pin farthest to the front (i.e., the portion connected to the tip of the pin) with a length of at least 30, 40 or 50 millimeters.

The distance of each point on the inside wall of the preform to be produced from the central axis of the preform may be less than 3.5 or 3 or 2.5 millimeters for a length of at least 30, 40 or 50 millimeters. This may be true at least for a portion of the inside wall connected to the preform bottom with a length of at least 30, 40 or 50 millimeters.

After closing the mold and until it is opened again for removing the preform, the core remains unmoving relative to the female mold. The polymer composition can then flow into the space between the core and the female mold as is the case, for example, in traditional injection molding processes.

The polymer composition may consist essentially of polyester. Compositions of the polymer composition are described further above.

The polyester may optionally contain one or more of the following additives: lubricants, dyes and UV, infrared, oxygen, acetaldehyde or water absorbers.

However, the polyester may also be free of one or more of the aforementioned additives.

Preferably no acetaldehyde-reducing additives are added to the polymer composition. Regardless of that, it is also possible to provide that no chain-lengthening additives (chain extenders) are added to the polymer composition.

According to one variant, the preform is produced by injection molding. In this case it may be advantageous if the average dwell time of the polymer composition in the injection machine used for the injection molding is less than 50 seconds and/or if the temperature in the injection machine is more than 250° C.

The acetaldehyde content of the polymer composition on leaving the injection machine may be less than 2.5 ppm, as may be measured according to the Fraunhofer method (1 W Freising 1.4001).

This method may be characterized in that the drop in viscosity of the polymer composition in the injection machine amounts to less than 0.02 dL/g. The polymer is PET, the decline in viscosity may be measured according to ASTM D4603. For other polymers, comparable methods are familiar to those skilled in the art.

Device parts that have been described, in particular the core and pin that have been described and the mold with the cavity are hereby disclosed as parts of a device for producing a preform and optionally for producing a plastic container from the preform, wherein the preform may be a preform such as that described in this document.

The preform described in this document is expediently produced by the method described in this document and/or the aforementioned method is embodied to produce the aforementioned preform.

A device for producing preform for use in a stretch blow molding process, in particular a two-step stretch blow molding process for producing a plastic container is hereby disclosed.

This device is designed to produce the preform disclosed in this document and/or to carry out the process disclosed in this document.

The device may have a mold with a cavity wherein
the cavity defines the shape of the preform to be produced which has a preform body extending along a central axis of the preform with a first end and a second end opposite the first end, wherein the first end is closed and having an inside wall bordering an interior space of the preform,
the cavity is formed by a female mold and a core,
the female mold is designed to define the exterior shape of the preform,
the core is designed to define the shape of the interior space of the preform in the area of the neck part of the preform,
the device has a pin which can be inserted into the cavity from the core along the central axis of the preform to be produced, the pin is designed to define at least a partial area of the shape of the interior space of the preform in the area of the preform body, in particular a partial area connected to the closed end of the preform, each point on the pin for a length of at least 30 millimeters is a distance of less than 3.5 millimeters away from the central axis of the pin and/or from the central axis of the preform to be produced, wherein this may involve 30 millimeters of the pin farthest toward the front.

Additional features of the device are described further above in conjunction with the preform and the process.

In addition, it may be provided that the device does not have a holding pressure module and/or does not have a shooting pot and/or does not have any intrusion of a worm gear.

Furthermore, a process for producing a plastic container, in particular a bottle from a preform as described in this document is also disclosed. This process involves a stretch blow molding process in which the preform is stretched and blow molded in a blow mold to form the plastic container.

Before the preform is stretched, it is heated to at least 90° C., such as in an oven. Before it is heated, the preform may have a temperature of less than 40° C. (in particular room temperature).

The plastic container produced from the preform advantageously has a capacity of less than 400 or 200 and/or more than 50 or 100 milliliters.

The plastic container may be strengthened by stretching.

Details of a method for producing a plastic container can also be obtained from the patent application referenced above with the title "Plastic Container and Stretch Blow Molding Process."

If a reference to a standard is not unambiguous, then the most recent version of the standard with a title closest to the title given here at the point in time of the filing of the patent application shall be used.

Terms in this document should be understood in the same way as they would be understood by those skilled in the art in this field. If several interpretations are possible in the respective context, then each interpretation will be disclosed individually. In particular for the case when there is a lack of clarity, the definitions listed in this document may be cited alternatively or additionally.

Actions disclosed in the form of suitabilities, capabilities, properties or functions of the device described in this document (or parts thereof) shall also be disclosed as process steps of the process (independently and in any combination) namely both independently and as a function of the corresponding device or the corresponding part of the device.

Use of features of the devices or parts of the devices described here shall also be disclosed (independently and in any combination) as process steps of the process.

Conversely, the disclosed device or parts of the device may have means which can carry out and/or are designed to carry out or more of the process steps mentioned in conjunction with the process disclosed here.

BRIEF DESCRIPTION OF THE DRAWINGS

In schematic diagrams, not drawn to scale.

EMBODIMENT OF THE INVENTION

The invention is described below as an example on the basis of the figures.

Figures 1A, 1B:
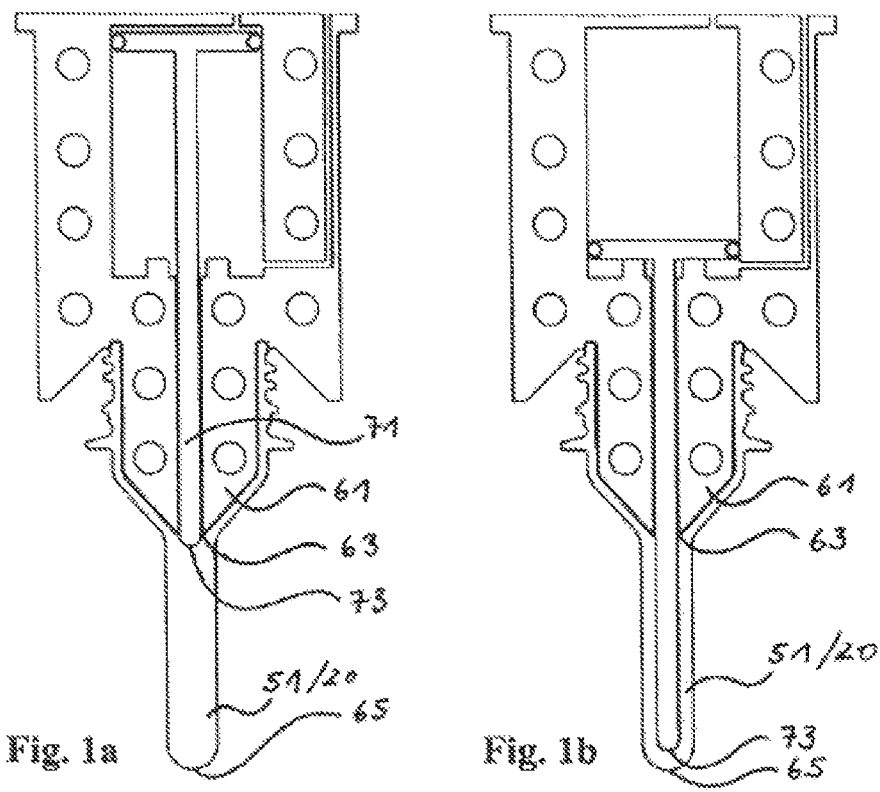
FIG. 1a: shows a sectional diagram of parts of a machine for production of a preform with the pin not yet inserted.
FIG. 1b: shows a diagram like that in FIG. 1 with the pin inserted.
Figure 2:
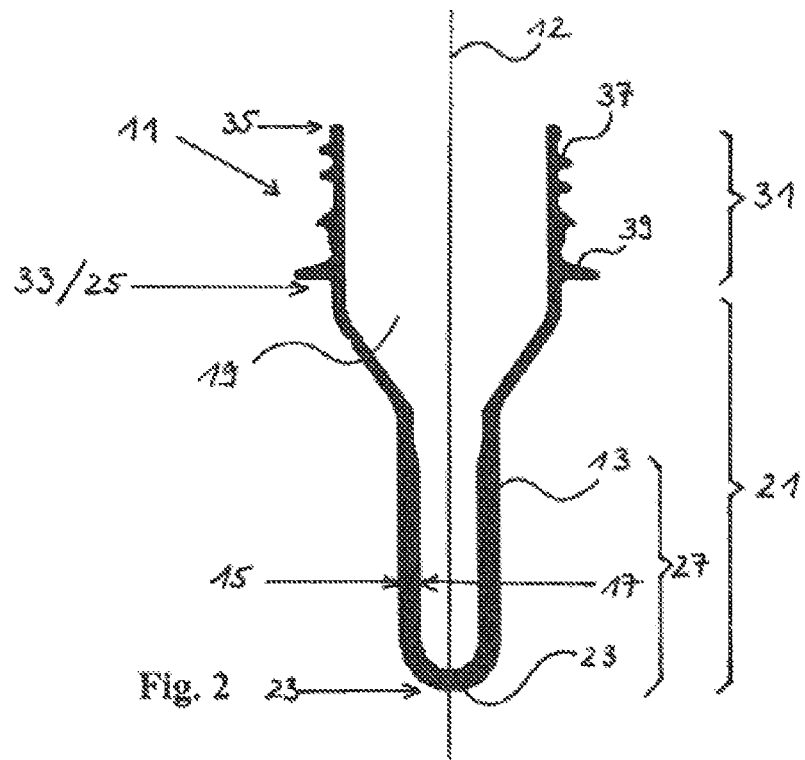
FIG. 2: shows a sectional diagram of a preform.

FIGS. 1a and 1b show device parts of a machine for producing a preform, while FIG. 2 shows a preform that can be produced using such a machine.

With reference to FIG. 2, the preform 11 has a preform body 21 and a neck part 31 connected to it. The central axis 12 of the preform 11 runs through a first end 23 and a second end 25 of the preform body 21, wherein the first end 23 of the preform body 21 is closed and forms a bottom of the preform 11. The neck part 31 has a pour opening 35 and is connected to the second end 25 of the preform body 21. In the proposed preform 11, the maximum distance of the inside 17 of the preform wall 13 from the central axis 12 amounts to less than 3.5 or 3 or 2.5 millimeters for a length of the central axis 12 of at least 30, 40 or 50 millimeters.

Additional advantageous features of the preform 11 include, as shown in FIG. 2, a thread 37 and a supporting ring 39 on the neck part 31. The thread 37 allows subsequent attachment of a cover (not shown) to the pour opening of the plastic container to be produced from the preform 11. The supporting ring 39 facilitates handling of the preform 11, which brings advantages in particular in the case of a two-step injection stretch blow molding process such as that provided for production of the preform 11 and of the plastic container (from the preform). In such a two-step process, the preform 11 is cooled to room temperature after being produced and only later is processed further to form a plastic container in a stretch blow molding process. The preform 11 is produced in one piece by injection molding from a polymer such as polyester, wherein this may also applicable to structures such as the thread 37 and the supporting ring 39, which are arranged on the outside 15 of the wall 13 of the preform 11. Like the preform body 21, the neck part 31 also has a first end 33 and a second end 35, wherein the first end 33 of the neck part 31 is connected to the second end 25 of the preform body 21, and the second end 35 of the neck part 35 has the pour opening. The latter leads into the interior space 19 of the hollow preform 11, wherein the interior space 19 extends from the pour opening to the bottom of the preform 11. The interior space 19 is bordered by the inside 17 (i.e., the internal surface) of the wall 13 which also has an exterior side 15 (i.e., an outer surface). The distance between the inside 17 and the outside 15 is the wall thickness, which may be larger on the average in the area of the preform body 21 than in the area of the neck part 31, wherein structures on the outside 15 of the wall 13, such as the thread 37 and the supporting ring 39, may be disregarded in evaluating the wall thickness. The wall thickness in the area of the neck part may advantageously be 0.5 to 3 millimeters. In the area of the preform body, the wall thickness may be 2 to 8 millimeters. In the production of the plastic container from the preform 11, only the preform body 21 is normally stretched and blow molded. The interior space 19 has a larger cross section in the area of the neck part 31 than in the area of the preform body 21, wherein the term cross section is understood to refer to the cross-sectional area at a right angle to the central axis 12. The central axis 12 of the preform 11 runs from the pour opening to the bottom, wherein they are essentially the same distance away from one another with respect to the points on the inside 17 opposite the central axis 12, i.e., running in the center of the interior space 19. In the area of the preform body 21 adjacent to the neck part 31, the interior space 19 tapers, reaching its smallest cross section in the area 27 of the first end 23 of the preform body 21. The inside 17 of the wall 13 is a distance of max. 3.5 millimeters from the central axis 12 in the area 27 just described, wherein this area is connected to the bottom of the preform 11 and is at least 30 millimeters long.

A preform 11 that is suitable for a two-step injection stretch blow molding process may have a circular cylindrical section of the preform body 21 extending in the direction of the bottom 23 of the preform, as shown in FIG. 2, adjacent to a bottom side of the supporting ring 39 facing away from the pour opening 35, the wall thickness of this cylindrical section being smaller than the wall thickness of a section of the preform body 21 connected to the bottom 23 of the preform. Typical wall thicknesses of the circular cylindrical section may be between 1 mm and 2.5 mm. A section of the preform body 21 which is usually conical and tapers in the direction of the bottom 23 of the preform, also referred to as the preform ramp or preform shoulder, and connects the circular cylindrical section to the section of the preform body 21 connected to the bottom 23 of the preform. The wall thickness of the conical section usually increases successively from the wall thickness of the circular cylindrical section to the wall thickness of the section of the preform body connected to the bottom 23 of the preform. Alternatively, as shown in FIG. 2, the wall thickness of the conical section may remain approximately constant, wherein the wall thickness of the preform body 21 then becomes larger only in the section of the preform body 21 connected to the bottom 23 of the preform, as may be the case with preforms having stepped preform bodies. Typical wall thicknesses of the section of the preform body 21 connected to the bottom 23 of the preform are 3 mm to 5 mm.

With regard to the production of the preform 11 described above, reference is made to FIGS. 1a and 1b where parts of the device suitable for this task are shown. The preform 11 from FIG. 2 can also be seen in FIG. 1b (cf. reference numeral 20). When mentioning parts of the preform 11, reference is also made supplementally to FIG. 2.

The preform 11 is produced by injection molding from a polymer composition 20. To do so, an injection mold having a cavity 51 is required, wherein the shape of the cavity 51 defines the shape of the preform 11 to be produced. The polymer composition 20 is produced by injection molding into the cavity 21 at a sprue point 65, wherein the cavity 51 is filled completely with the polymer composition 20. During the injection, the cavity 51 is formed by a female mold (not shown) and core 61 wherein the female mold defines the shape of the entire outside 15 of the wall 13 of the preform 11 to be produced and wherein the core 51 defines the shape of the inside 17 of the wall 13 of the preform 11 to be produced in the area of the neck part 31. Due to the contact with the cooled female mold and the cooled core 61, there is a drop in the temperature of the polymer composition 20, which is still above the melting point of the polymer composition 20 on entrance into the cavity 51. Volume shrinkage occurs due to the cooling of the polymer composition 20, i.e., the polymer composition 20 shrinks. The volume thereby freed up in the cavity 51 that was previously completely full is filled by a pin 71 that is inserted through an opening 63 from the core 61 into the cavity 51. While the pin 71 is in the core 21 that is cooled, it is cooled from the outside due to the direct contact with the cooled core 21. However, it does not have any cooling ducts itself. Since the polymer composition 20 cools from the outside to the inside, it is still molten at the location where the pin 71 is inserted into the polymer composition 20. The pin 71 presses the polymer composition 20 against the female mold when it is being inserted and thereby prevents the polymer composition from separating from the mold. The pin 71 thus inserted into the cavity 51 alters the shape of the cavity 51 and defines the shape of the inside 17 of the wall 13 of the preform 11 in an area 27 of the preform body 21, wherein the tip 73 of the pin 71 defines the shape of the inside 17 of the bottom of the preform 11. The aforementioned area 27 is a partial area at least 30 millimeters long, connected to the inside 17 of the bottom of the preform 11. Since the pin 71 is only inserted when the polymer composition 20 is already in the cavity 51, the polymer composition 20 must not flow around the pin 71 during injection. Instead of a narrow annular channel between the pin and the female mold, the polymer composition 20 has only a limited channel through the female mold from the injection point 64 until reaching the core 61 for distribution in the cavity 51. This prevents the polymer composition 20 from cooling too rapidly and thus increases the flexibility with regard to the dimensioning of the preform. When the pin 71 has been completely inserted into the cavity 51 (i.e., until reaching its intended end position), the shape of the cavity 51 corresponds to the shape of the preform 11 to be produced. The polymer composition 20 cools in the cavity 51 down to below the glass transition temperature and solidifies. The resulting preform 11 may then be removed from the cavity 51.

The invention claimed is:

1. A preform for producing a plastic container in a two-step injection stretch blow molding process, comprising:
   a preform body extending along a central axis thereof and having a first end and a second end opposite the first end, the first end being closed by a preform bottom;
   a neck part having a pour opening connected to the second end of the preform body; and
   a wall of the preform defining an inner surface bordering an interior space of the preform, each point on the inner surface of the wall being less than 3.5 mm away from the central axis for a length of at least 30 mm along the central axis.

2. The preform of claim 1, wherein each point on the inner surface of the wall is less than 3 mm or less than 2.5 mm away from the central axis.

3. The preform of claim 1, wherein the preform body is comprised of polyester, the polyester being PEF or PET.

4. The preform of claim 1, wherein an (a)/(b) ratio is greater than 60 and less than 110, wherein (a) is an average wall thickness of the preform in an area of the preform body and (b) is a length of the wall of the preform from the pour opening to a midpoint of the preform bottom in vertical direction of the preform, wherein the length of the wall is to be measured along a line running in the area of the preform body at the center of the wall and running at a constant distance from the inner surface in an area of the neck part, wherein the constant distance corresponds to a distance from the inner surface to the center of the wall at a location of the smallest wall thickness.

5. The preform of claim 4, wherein the inner surface in the area of the neck part is a distance of more than 4.5 mm up to 11 mm away from the central axis in at least a partial area.

6. The preform of claim 1, wherein the preform is for producing a plastic container with a capacity of less than 400 milliliters.

7. The preform of claim 1, wherein the preform has an acetaldehyde content of less than 2.5 ppm at an age of less than 6 months.

8. The preform of claim 1, wherein the preform does not contain any acetaldehyde-reducing additives or any chain extender additives.

9. The preform of claim 4, wherein a diameter of an inner surface of the neck part is greater than 9 millimeters and less than 22 millimeters.

10. The preform of claim 4, wherein a first average wall thickness of a first wall section connected to the bottom of the preform is larger by at least 80% than a second average wall thickness of a second wall section connected to the neck part.

11. The preform of claim 1, wherein the preform body is essentially rotationally symmetrical.

12. The preform of claim 1, wherein the preform body is elongate and essentially tubular.

13. The preform of claim 1, wherein the central axis runs through the first end and through the second end of the preform body.

14. The preform of claim 4, wherein the area of the preform body extends from the bottom of the preform.

* * * * *